Figure 1:
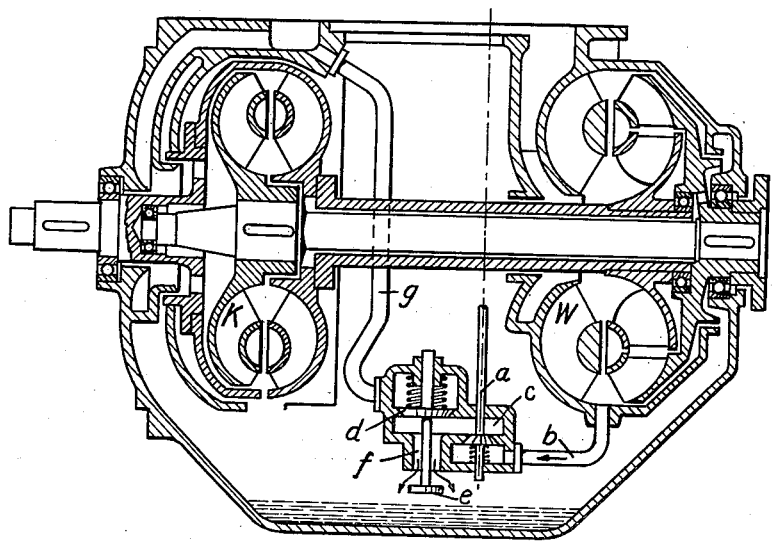

June 15, 1937.   F. CANAAN   2,083,828
FLUID TRANSMISSION HAVING A NUMBER OF FLUID CIRCUITS
Filed March 25, 1936

INVENTOR
*Faic Canaan*
BY
ATTORNEYS

Patented June 15, 1937

2,083,828

UNITED STATES PATENT OFFICE 2,083,828

FLUID TRANSMISSION HAVING A NUMBER OF FLUID CIRCUITS

Faic Canaan, Heidenheim-on-the-Brenz, Germany

Application March 25, 1936, Serial No. 70,900
In Germany February 25, 1935

2 Claims. (Cl. 60—54)

The invention relates to fluid transmissions having a number of circuits, its object being to supply directly the working fluid from one circuit to another one without using an intermediate storage tank, and thus reduce considerably the change over period.

Its object is to conduct the working fluid from the fluid circuit to be emptied direct to the one to be filled through a simple connecting piping without interconnection of a storage tank or a delivery pump. The valve controlling the flow of oil is installed within the aforementioned piping. In case two or more fluid circuits are used alternatively, two or more pipings may be arranged to interconnect the circuits which can be controlled so that for instance in case of a transmission with two circuits the emptying space (space under pressure at large diameter) of the one circuit is connected with the filling (suction) space (at small diameter) of the other circuit.

The centrifugal pressure of the circuit to be emptied is strongly supported by the suction effect of the circuit to be filled so that even at low speeds it will always be possible to completely empty the one and fill the other circuit. A check valve arranged in the piping prevents both circuits from being filled, or partially filled, during stopping, and automatically closes the connecting piping after it has been used.

The filling up of oil due to leakage and the exchange of oil for cooling purposes in a special additional circuit can be effected in the usual way by means of an auxiliary pump which may continuously work and which can be of considerably smaller dimensions than the pumps used so far to fill the circuits.

An example of the aforementioned arrangement is given on the drawing.

Valve $a$ is operated at will or automatically. Valve $a$ serves to empty converter circuit W and is connected with the circumference of same by piping $b$. Upon opening valve $a$ the oil leaves the converter highly compressed by the centrifugal force of same and enters into chamber $c$. During a normal state of operation, check valve $d$ closes this space against connecting piping $g$ leading to the coupling circuit. Said check valve $d$ is fitted with a downward extension with valve head $e$ of smaller diameter on its lower end which leaves discharge canal $f$ open to the surge tank when the check valve is closed.

If, now, at opening of valve $a$ the oil leaves the converter circuit W under pressure and enters into chamber $c$, check valve $d$ is raised and the discharge to the surge is closed by valve $e$. The oil now takes its course over piping $g$ into the supply canal to the coupling and enters into coupling circuit K near the axle. As the oil pressure at the discharge of converter W decreases towards the end of the emptying process, check valve $d$ falls back onto its seat and discharge canal $f$ opens again permitting a complete emptying of the oil from the converter.

I claim:—

1. In combination, a pair of physically interconnected hydraulic mechanisms each including a driving member and a driven member, said members forming fluid circuits, the driving and driven members depending for their operativeness upon a supply of fluid in said circuits, means connecting the outlet of one of said mechanisms to the inlet of the other of said mechanisms whereby the pressure on the fluid in the filled mechanism will cause said fluid to be discharged through the inlet of the unfilled hydraulic mechanism, a surge tank associated with said mechanisms, a spring-pressed check valve between said mechanisms having a downward extension with a valve head of smaller diameter on its lower end controlling a discharge passage of fluid into said tank upon the fall of pressure in said connecting means between the hydraulic mechanisms, said valve head being opened when the spring-pressed check valve is closed, and vice versa.

2. In combination, an hydraulic converter and an hydraulic coupling, a casing common to said devices and provided with a surge tank below said converter and coupling, a casing having connections with said converter and coupling, a spring-pressed check valve located in the second casing, said valve having a downward extension with a valve head thereon of smaller diameter for controlling a discharge passage for fluid into said tank upon the fall of pressure in the connection between said hydraulic converter and hydraulic coupling, said valve head being opened when the spring-pressed check valve is closed, and vice versa.

FAIC CANAAN.